United States Patent [19]

Horst, Jr.

[11] Patent Number: 5,125,269
[45] Date of Patent: Jun. 30, 1992

[54] SIGHT GLASS

[75] Inventor: George Horst, Jr., Omaha, Nebr.

[73] Assignee: Regal Plastics Supply of Omaha, Omaha, Nebr.

[21] Appl. No.: 775,614

[22] Filed: Oct. 15, 1991

[51] Int. Cl.$^5$ .............................................. G01F 23/02
[52] U.S. Cl. ....................................... 73/323; 73/325; 116/276; 137/559
[58] Field of Search ................. 73/323, 328, 330, 334, 73/326, 325; 116/276; 137/559

[56] References Cited

U.S. PATENT DOCUMENTS

| | | |
|---|---|---|
| 333,046 | 12/1885 | Young . |
| 502,073 | 7/1893 | Hallsman . |
| 1,615,118 | 1/1927 | Farragher et al. . |
| 2,024,815 | 12/1935 | Blackburn ............... 73/330 |
| 2,313,889 | 3/1943 | Porter ..................... 73/323 |
| 3,307,400 | 3/1967 | LeRoy ................... 116/276 |
| 3,380,303 | 4/1968 | LeRoy ..................... 73/334 |
| 4,809,862 | 3/1989 | Canty ..................... 73/328 |
| 4,888,990 | 12/1989 | Bryan et al. ............ 73/326 |

FOREIGN PATENT DOCUMENTS

| | | | |
|---|---|---|---|
| 534572 | 1/1955 | Belgium ............... | 137/559 |
| 0145796 | 1/1981 | Fed. Rep. of Germany ........ | 73/323 |

Primary Examiner—Thomas B. Will
Attorney, Agent, or Firm—Zarley, McKee, Thomte, Voorhees & Sease

[57] ABSTRACT

A sight glass includes a solid acrylic ring-shaped body with a glass tubular liner mounted to the interior cylindrical surface of the body with a fuel and fuel-additive resistant sealant. The liner has a diameter slightly less than the interior diameter of the body so as to form an annular air space therebetween. The sealant is also an adhesive which connects the liner to the body. O-rings at the forward and rearward edges of the liner maintian the annular air space between the liner and body. The adhesive/sealant is a flexible resilient material which will permit the liner to move slightly longitudinally.

10 Claims, 1 Drawing Sheet

SIGHT GLASS

TECHNICAL FIELD

The present invention relates to sight glasses and more particularly to a sight glass for use in fuel lines.

BACKGROUND OF THE INVENTION

A tanker-type truck is conventionally utilized to transport fuel from storage depots to various service stations. Typically, the tanker is divided into a plurality of containers holding various types of fuel. A sight glass is preferably provided in the discharge tube from the tanker so that the flow of fuel may be directly observed by the tanker driver when discharging the fuel into the storage tanks at the service station. In this way, the tanker driver can check that fuel is flowing through the tube, as well as confirm the type of fuel flowing therethrough.

One type of sight glass currently utilized for this purpose is composed of a solid clear cast acrylic substance formed in the shape of a ring. The clear acrylic ring is then fastened between a pair of flanges conventionally found in a connection between two sections of the tanker discharge tube. In this way, fuel flows through the hollow interior of the clear acrylic ring for viewing by the tanker driver.

It is not uncommon to find additives mixed in with conventional fuel products in order to raise the octane level of the fuel. Such additives, such as MTBE, have been found to dissolve, craze, or optically cloud the acrylic material, thereby reducing the effectiveness of the material as a sight glass. Acrylic is preferred material for use as a sight glass in fuel lines, since the material is clear, yet more resistant to breakage than glass.

It is therefore a general object of the present invention to provide an improved sight glass for fuel lines.

Another object of the present invention is to provide a sight glass which is resistant to fuel additives.

Still another object is to provide a sight glass which may be formed of solid acrylic yet is sealed from fuel additives.

These and other objects will be apparent to those skilled in the art.

SUMMARY OF THE INVENTION

The sight glass of the present invention includes a solid acrylic ring-shaped body with a glass tubular liner mounted to the interior cylindrical surface of the body with a fuel and fuel additive resistant sealant. Preferably, the liner has a diameter slightly less than the interior diameter of the body so as to form an annular air space therebetween. The sealant is also an adhesive which connects the liner to the body. O-rings at the forward and rearward edges of the liner maintain the annular air space between the liner and body. The adhesive/sealant is preferably a flexible resilient silicone which will permit the liner to move slightly longitudinally. Bolt holes through the ring-shaped body permit quick and simple connection between flanges of a conventional fuel line on a tanker truck.

DESCRIPTION OF THE PREFERRED EMBODIMENT

Figure 1:
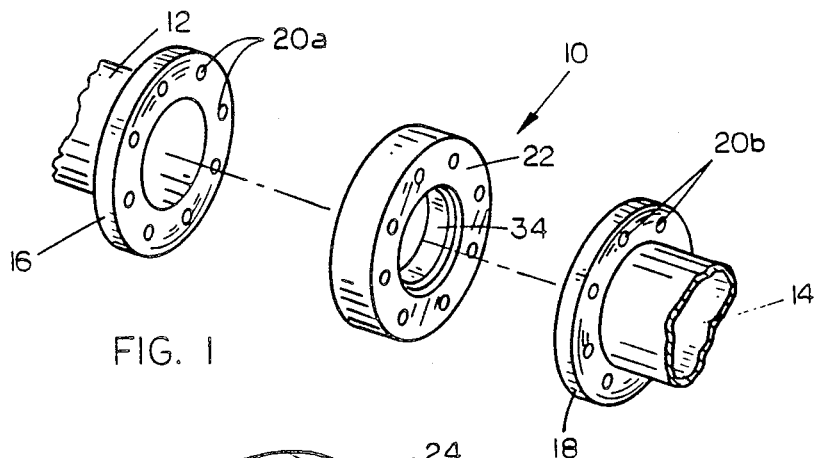
FIG. 1 is a pictorial view of the sight glass of the present invention interposed between the connection of two sections of a fuel tanker discharge tube.

Referring now to the drawings, in which identical or corresponding parts are identified with the same reference numeral, and more particularly to FIG. 1, the sight glass of the present invention is identified generally at 10 and is preferably interposed between two sections 12 and 14 of a fuel discharge pipe on a tanker truck. Obviously, sight glass 10 could be mounted at any location between the tank or reservoir on the tanker and the end of the discharge hose. Pipe sections 12 and 14 are merely used as a convenient example.

Pipe sections 12 and 14 are conventionally fastened together at corresponding flanges 16 and 18 having a plurality of corresponding apertures 20a and 20b respectively. Flanges 16 and 18 are fastened together utilizing bolts (not shown) inserted through apertures 20a and 20b to fasten flanges 16 and 18 in sealed contact.

Figure 2:
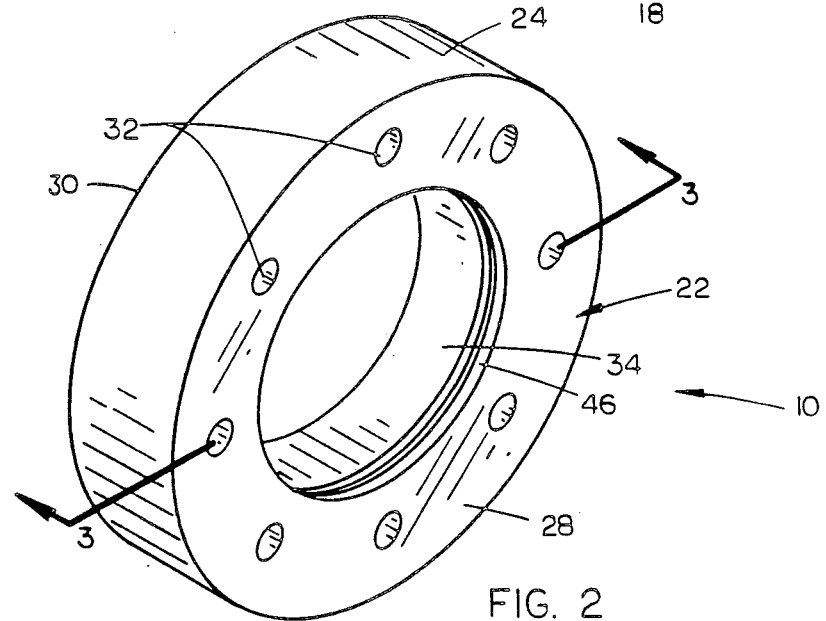
FIG. 2 is an enlarged perspective view of the sight glass of the present invention.
Figure 3:
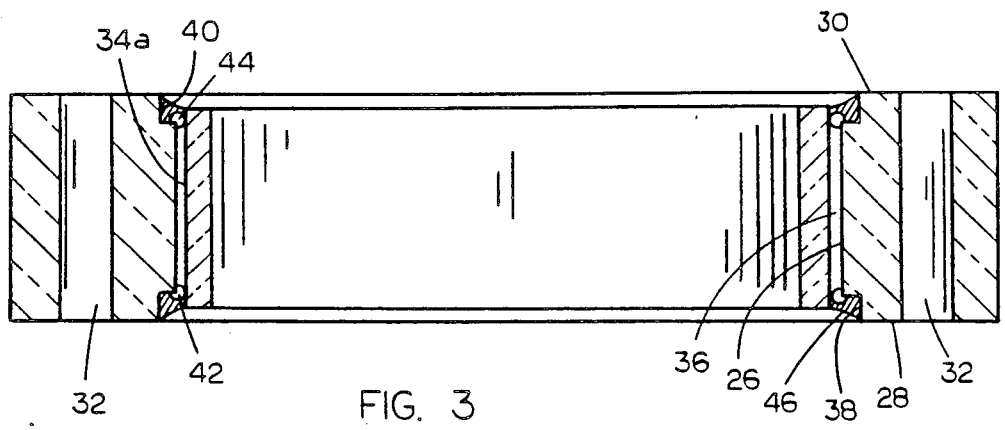
FIG. 3 is a sectional view taken at lines 3—3 in FIG. 2.

Referring now to FIGS. 2 and 3, sight glass 10 includes a ring-shaped body 22 having an exterior cylindrical surface 24, an interior cylindrical surface 26, a forward flat face 28 and a rearward face 30. Body 22 is preferably of a clear cast acrylic, with a plurality of bolt holes 32 extending from front face 28 to rear face 30 and parallel to the central axis of body 22. Bolt holes 32 are positioned to match the positioning of apertures 20a and 20b on pipe sections 12 and 14, to permit the connection of sight glass 10 between flanges 16 and 18. After the acrylic body 22 has been formed and machined it is subjected to an annealing process to strengthen the material.

A cylindrical tubular borosilicate glass liner 34 is mounted to the interior surface 26 of body 22. Glass liner 34 has a length less than the length (as measured from front face 28 to rear face 30) less than that of body 22. The exterior diameter of glass liner 34 is less than the interior diameter of body 22 so as to provide a small annular air space 36 between glass liner 34 and interior surface 26.

An annular notch 38 is formed between forward face 28 and interior surface 26 of body 22, as shown in FIG. 3. A similar rearward annular notch 40 is formed between rearward face 30 and interior surface 26. An O-ring 42, is inserted between the exterior surface 34a of glass liner 34 and interior surface 26 of body 22 in notch 38. A similar O-ring 44 is installed in rearward notch 40. O-rings 42 and 44 will hold glass liner 34 spaced from interior surface 26 of body 22. Notches 38 and 40 are then filled with a high temperature fuel resistant silicone from the forward edge of glass liner 34 to front surface 28 of body 22, and from the rearward edge of glass liner 34 to rearward face 30 of body 22. A silicone material such as that sold by General Electric under the brand name FRV 1106 serves both as a sealant material to protect the O-rings and acrylic material from fuel, but also as an adhesive to hold glass liner 34 flexibly in position.

Preferably, the interior diameter of glass liner 34 is approximately the same as the interior diameter of pipe sections 12 and 14, such that fuel flow through glass liner 34 is not impeded. In order to reduce the chance of dynamic forces of fuel flow from breaking glass liner 34, the resilient and flexible silicone sealant 46 will permit resilient longitudinal movement of glass liner 34.

Whereas the invention has been shown and described in connection with the preferred embodiment thereof, it will be understood that many modifications, substitutions and additions may be made which are within the intended broad scope of the appended claims. There has therefore been shown and described an improved sight glass which accomplishes at least all of the above stated objects.

I claim:

1. A sight glass comprising:
   a solid ring-shaped body of optically clear material having an exterior peripheral surface, an interior cylindrical surface, a generally vertical forward face and a generally vertical rearward face;
   a hollow tubular liner of optically clear material which is resistant to fuel and fuel additives, mounted coaxial to said ring and connected to the interior surface thereof, said liner having a forward edge, a rearward edge, an exterior cylindrical surface and an interior cylindrical surface; and
   means for resiliently connecting and sealing said liner directly to said body to maintain the liner coaxial with and spaced interiorly of the body to form an annular gap between said ring and liner.

2. The sight glass of claim 1, wherein said means for connecting and sealing said liner to the body includes adhesive applied between said liner and said body.

3. The sight glass of claim 2, wherein said adhesive is a material which forms a resilient, flexible seal between said liner and said body, such that said liner is permitted to move slightly along its longitudinal axis when subjected to a longitudinally directed force.

4. The sight glass of claim 1, wherein said body is acrylic.

5. The sight glass of claim 1, wherein said liner is glass.

6. The sight glass of claim 4, wherein said liner is glass.

7. The sight glass of claim 1, further comprising bolt holes formed through said body which are parallel and equidistant from the longitudinal axis of said ring-shaped body, and evenly spaced therearound, to connect said sight glass to a fuel line.

8. The sight glass of claim 3, wherein said adhesive is silicone.

9. A sight glass comprising:
   a solid ring-shaped body of optically clear material having an exterior peripheral surface, an interior cylindrial surface, a generally vertical forward face and a generally vertical rearward face;
   a hollow tubular liner of optically clear material which is resistant to fuel and fuel additives, mounted coaxial to said ring and connected to the interior surface thereof, said liner having a forward edge, a rearward edge, an exterior cylindrical surface and an interior cylindrical surface;
   the width of said liner, as measured from the forward edge to the rearward edge, being less than the width of the ring-shaped body, as measured from the forward face to the rearward face;
   the outer diameter of said liner being less than the inner diameter of the interior cylindrical surface of said body to form an annular air space therebetween;
   forward and rearward resilient O-rings interposed between the forward and rearward edges of said liner and the interior surface of said body to resiliently maintain said liner spaced from the interior surface of said body; and
   means for connecting said liner to said body to maintain the liner coaxial with and interior of the body, including:
      adhesive resistant to fuel and fuel additives applied between said liner and said body;
      said adhesive extending from the forward edge of the liner to the forward face of the body and extending from the rearward edge of the liner to the rearward face of the body; and
      said adhesive being a material which forms a resilient, flexible seal between said liner and said body.

10. The sight glass of claim 9, wherein said adhesive covers said O-rings to protect them from fuel and fuel additives.

* * * * *